United States Patent
Yamada (10) Patent No.: US 7,411,387 B2
(45) Date of Patent: Aug. 12, 2008

(54) POSITION DETECTION APPARATUS AND VEHICLE MIRROR ANGLE DETECTION APPARATUS

(75) Inventor: Ayako Yamada, Fujieda (JP)

(73) Assignee: Murakami Corporation, Shizouka (JP)

( * ) Notice: Subject to any disclaimer, the term of this patent is extended or adjusted under 35 U.S.C. 154(b) by 0 days.

(21) Appl. No.: 11/602,054

(22) Filed: Nov. 20, 2006

(65) Prior Publication Data

US 2007/0176597 A1 Aug. 2, 2007

(30) Foreign Application Priority Data

Jan. 30, 2006 (JP) ............................. 2006-019943

(51) Int. Cl.
*G01B 7/14* (2006.01)
(52) U.S. Cl. ............................ 324/207.24; 324/207.11; 324/207.25
(58) Field of Classification Search ......... 324/173–174, 324/207.24–207.26, 207.2, 251, 207.11, 324/207.13; 73/514.31, 514.39

See application file for complete search history.

(56) References Cited

U.S. PATENT DOCUMENTS 7,268,536 B2 * 9/2007 Hagino et al. .......... 324/207.24

* cited by examiner

*Primary Examiner*—Bot LeDynh
(74) *Attorney, Agent, or Firm*—James V. Costigan; Hedman & Costigan, P.C.

(57) ABSTRACT

To provide a position detection apparatus with an expanded range of good linearity in a magnetic sensor's output characteristic with respect to position of a movable body as well as to provide a vehicle mirror angle detection apparatus using the position detection apparatus. Two permanent magnets 42 and 44 and one Hall-effect sensor 46 are used. The permanent magnets 42 and 44 are arranged with their relative position fixed. The Hall-effect sensor 46 is placed laterally to the arrangement of the two permanent magnets 42 and 44. The permanent magnets 42 and 44 and Hall-effect sensor 46 move relative to each other in a direction parallel to the arranging direction of the permanent magnets 42 and 44. Those surfaces 42a and 44a of the permanent magnets 42 and 44 which face the Hall-effect sensor 46 constitute magnetic pole faces of opposite polarity and the magnetic pole faces 42a and 44a are placed with an inward tilt. A magnetic sensing direction F of the Hall-effect sensor 46 is set orthogonally to the arranging direction of the permanent magnets 42 and 44.

9 Claims, 12 Drawing Sheets

POSITION DETECTION APPARATUS AND VEHICLE MIRROR ANGLE DETECTION APPARATUS

The disclosure of Japanese Patent Application No. JP2006-19943 filed on Jan. 30, 2006 including the specification, drawing and abstract is incorporated herein by reference in its entirety.

BACKGROUND OF THE INVENTION

1. Field of the Invention

The present invention relates to an apparatus which detects position of a movable body using a magnetic sensor. The apparatus expands a range in which good linearity is obtained. Also, the present invention relates to a vehicle mirror angle detection apparatus using the position detection apparatus.

2. Description of the Related Art

A vehicle mirror angle detection apparatus is incorporated in a so-called remote-control door mirror which allow up-and-down and left-to-right tilt angles of its mirror surface to be adjusted using a motor. The apparatus detects absolute angular position and angular displacement of the mirror surface in up-and-down and left-to-right directions with respect to a predetermined reference angular position. The mirror angle detection apparatus detects a mirror angle adjusted, for example, by the driver and stores it in memory. Subsequently, after the mirror angle is changed, the apparatus is used to automatically return the mirror to its original angular position by reading a setting value out of the memory at the touch of a button. The vehicle mirror angle detection apparatus is also used to detect displacement of a mirror angle in a so-called reverse-shift-activated mirror angle control which allows a driver to visually check areas around rear wheels during backing-up (e.g., when backing into a parking space) by turning a mirror surface of a vehicle outer mirror downward by a predetermined amount simultaneously as gear-shifting means of a vehicle is set to a reverse position and restores the mirror face to the original mirror angular position by turning the mirror surface upward by a predetermined amount simultaneously as the gear-shifting means is subsequently switched to another operating position from the reverse position.

Figure 2:
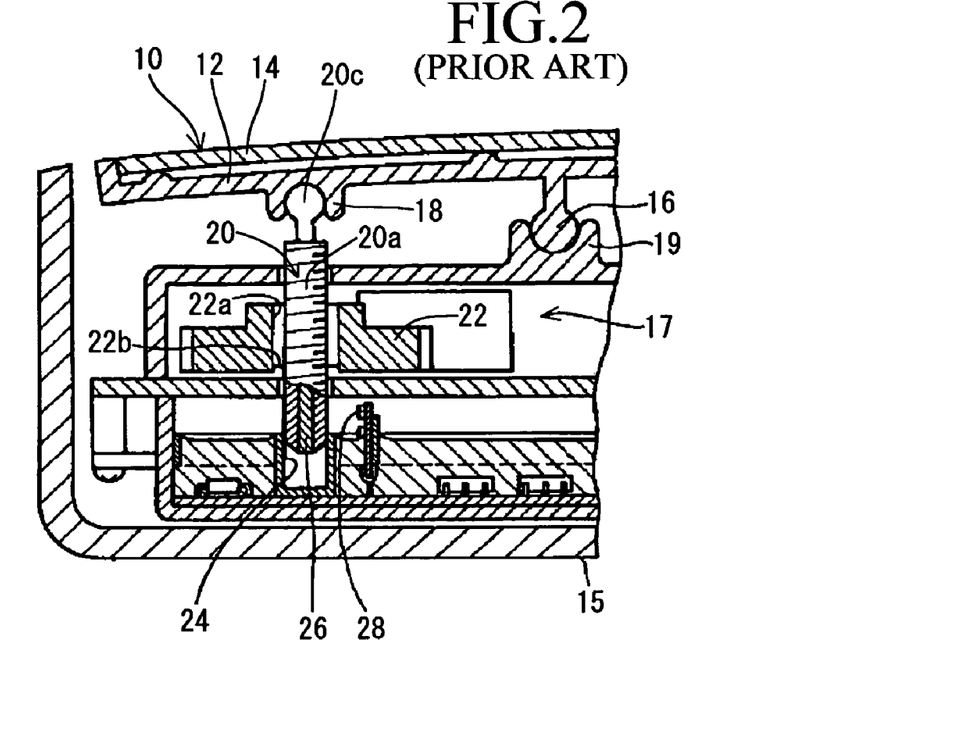
FIG. 2 is a sectional view showing part of an internal structure of a vehicle mirror equipped with a conventional mirror angle detection apparatus.

Vehicle mirror angle detection apparatus which use a magnetic sensor such as a Hall-effect sensor have been proposed previously. For example, Patent Document 1 discloses a structure shown in FIG. 2. In FIG. 2, a mirror body 10 consists of a mirror plate 14 fitted in the front face of a mirror holder 12. A pivot 16 protrudes from the rear center of the mirror body 10. A mirror drive unit 17 (mirror angle adjustment actuator unit) is housed and stationarily placed in a front opening of a mirror housing 15 behind the mirror body 10. A universal joint 19 is formed in the front center of the mirror drive unit 17 and the pivot 16 of the mirror body 10 is pivotally coupled to the universal joint 19. The mirror body 10 tilts (swings) around the pivot 16 to adjust the mirror angle.

On the rear face of the mirror body 10, a universal joint 18 is installed away from the pivot 16. A spherical part 20c at an upper end of a screw rod 20 of the mirror drive unit 17 is pivotally coupled with the universal joint 18. The screw rod 20 penetrates a center hole 22a of a gear plate 22. A lower end of the screw rod 20 is slidably led into a guide groove 24 along its axis. The screw rod 20 is restrained from rotating around its axis. With its axial movement restrained, the gear plate 22 is rotatably driven around its axis by a mirror angle adjustment motor (not shown). A spring 22b is installed in the center hole 22a of the gear plate 22. The spring 22b is engaged with a thread groove 20a in the outer surface of the screw rod 20.

With this configuration, when the gear plate 22 is rotatably driven by a mirror angle adjustment motor, the mesh between the thread groove 20a and spring 22b causes the screw rod 20 to move linearly in the axial direction with its rotation around its axis restrained. The linear movement of the screw rod 20 causes the mirror body 10 to tilt around the pivot 16, thereby adjusting the mirror angle.

A rod-shaped permanent magnet 26 is embedded in lower part of the screw rod 20 along the central axis of the screw rod 20. The magnetization direction of the permanent magnet 26 corresponds to the axial direction (longitudinal direction). One end in the axial direction constitutes the North (or South) magnetic pole and the other end constitutes the South (or North) magnetic pole. A Hall-effect sensor 28 serving as a magnetic sensor is stationarily placed on the mirror drive unit 17, facing a lower outer surface of the screw rod 20. The axial movement of the screw rod 20 causes changes in that component of a magnetic flux linking the Hall-effect sensor 28 which is oriented in a magnetic sensing direction of the Hall-effect sensor 28, thereby causing the Hall-effect sensor 28 to output a Hall voltage corresponding to axial position of the screw rod 20, i.e., the mirror angle (where the magnetic sensing direction is a direction in which a given element responds to magnetism—i.e., the direction orthogonal to supplied bias current in the case of a Hall-effect sensor and direction orthogonal to the axis of the permanent magnet 26 in the arrangement in FIG. 2). Thus, the mirror angle is detected from the Hall voltage.

Figure 3:
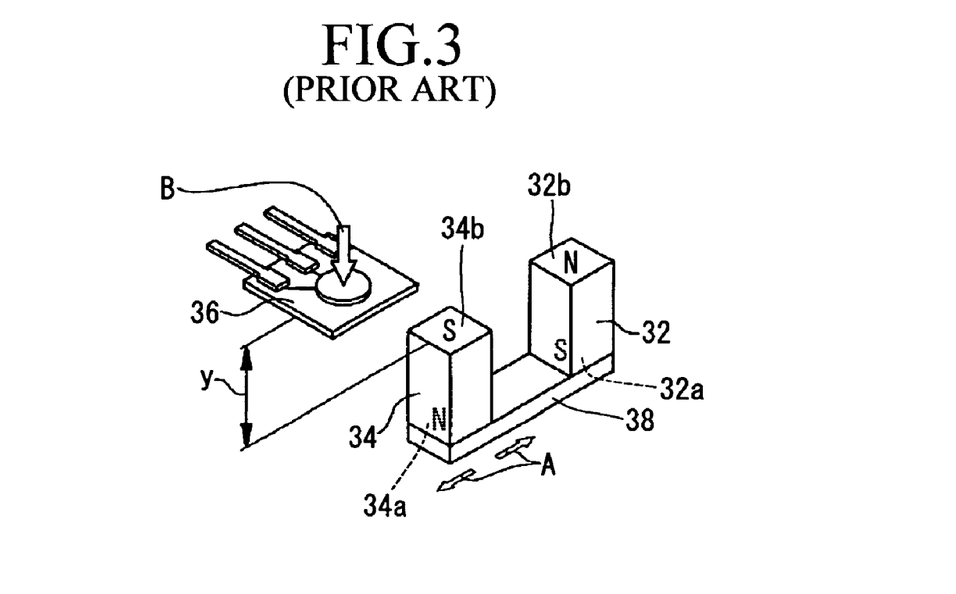
FIG. 3 is a perspective view showing another arrangement of permanent magnets and magnetic sensor in a conventional vehicle mirror angle detection apparatus.

Also, Patent Document 2 discloses a configuration of a vehicle mirror angle detection apparatus which uses two permanent magnets 32 and 34 and one Hall-effect sensor 36 as shown in FIG. 3. The permanent magnets 32 and 34 are arranged away from each other and coupled with each other by a coupler 38. The permanent magnets 32 and 34 move linearly in a direction (direction indicated by arrow A) parallel to an arranging direction of the permanent magnets 32 and 34 as the mirror angle is adjusted. Pole faces of the permanent magnets 32 and 34 consist of end faces 32a and 34a fastened by the coupler 38 and end faces (free ends) 32b and 34b on the opposite side. Magnetization directions of the permanent magnets 32 and 34 are opposite to each other. The Hall-effect sensor 36 is located across a gap y of a predetermined length from the end faces 32b and 34b of the permanent magnets 32 and 34. As the mirror angle is adjusted, movement of the permanent magnets 32 and 34 in the direction of arrow A causes changes in that component of a magnetic flux linking the Hall-effect sensor 36 which is oriented in a magnetic sensing direction (direction indicated by arrow B) of the Hall-effect sensor 36, thereby causing the Hall-effect sensor 36 to output a Hall voltage corresponding to the mirror angle. Thus, the mirror angle is detected from the Hall voltage.

[Patent Document 1] Japanese Utility Model Laid-Open No. 64-28343 (FIG. 1)

[Patent Document 2] U.S. Pat. No. 6,382,806 (FIG. 3D)

The mirror angle detection apparatus described in Patent Document 1 provides good linearity in characteristics of the Hall voltage of the Hall-effect sensor 28 with respect to the position of the permanent magnet 26 only in a narrow range. Similarly, the mirror angle detection apparatus described in Patent Document 2 also provides good linearity in characteristics of the Hall voltage of the Hall-effect sensor 36 with respect to the positions of the permanent magnets 32 and 34 only in a narrow range.

Figure 4:
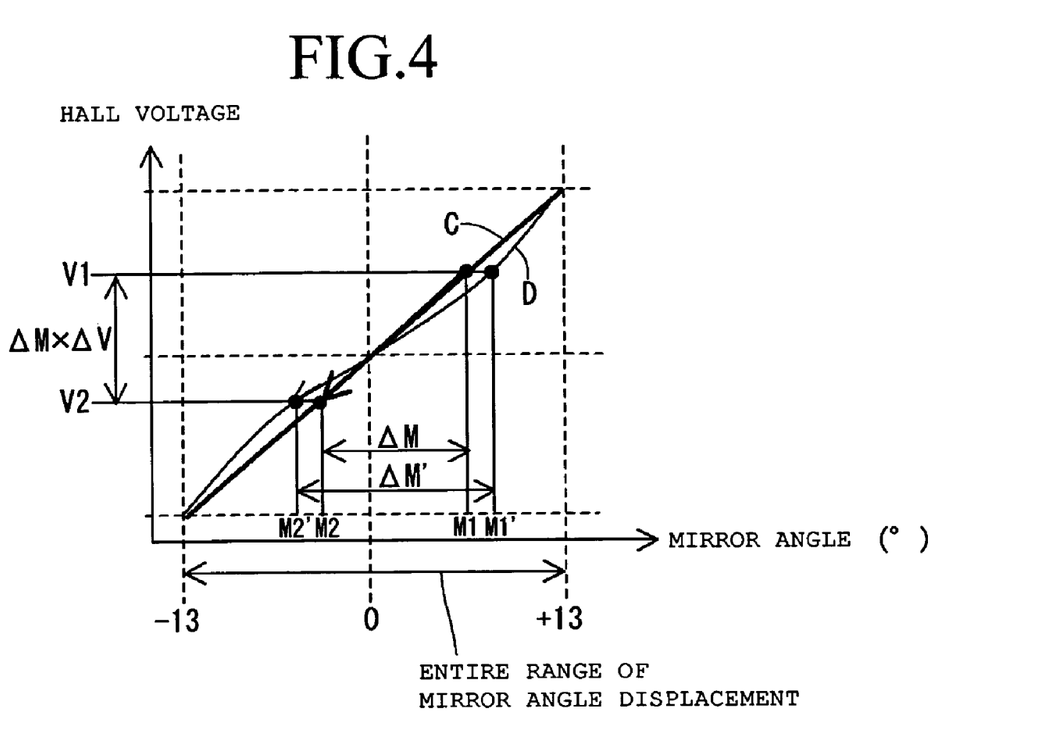
FIG. 4 is a diagram showing a relationship between mirror angle and Hall voltage in a vehicle mirror angle detection apparatus to illustrate how differences in linearity result in errors in detected angles.

Thus, the mirror angle detection apparatus described in Patent Documents 1 and 2 provide good linearity in characteristics of magnetic sensor output (Hall voltage) with respect to the position of the permanent magnet(s) (i.e., mirror angular position) only in a narrow range, leaving no choice but to use the range in which poor linearity is obtained. This causes errors, for example, in detection of displacement in the mirror angle during reverse-shift-activated operation. Specifically, if $\Delta M$ denotes a target angular displacement by which the mirror surface is turned downward (e.g., $\Delta M=6°$) and $\Delta V$ denotes the amount of change in the Hall voltage per one-degree mirror angular displacement, the reverse-shift-activated operation involves turning the mirror surface downward by the target angular displacement $\Delta M$ by turning the mirror surface downward to an angular position where the Hall voltage changes by a set value of $\Delta M \times \Delta V$ from the value of the Hall voltage before the start of the reverse-shift-activated operation. FIG. 4 shows relationship between the mirror angle and Hall voltage at this time. Heavy line C indicates a case where the change characteristic of the Hall voltage with respect to the mirror angular position is an ideal straight line. In the case of the ideal straight line, if the Hall voltage at a mirror angular position M1 before the start of the reverse-shift-activated operation is V1, when gear-shifting means of the vehicle is set to a reverse position and the mirror surface is turned downward until the Hall voltage reaches V2 ($V2=V1-\Delta M \times \Delta V$) by changing (decreasing) $\Delta M \times \Delta V$, the mirror surface turns exactly by the target angular displacement $\Delta M$ and stops at a mirror angular position M2. This allows the driver to back up the vehicle by visually checking areas around rear wheels properly.

On the other hand, light line D indicates a narrow range of good linearity in the change characteristic of the Hall voltage with respect to the mirror angular position (i.e., poor linearity in the characteristic as a whole). In this case, if the Hall voltage at a mirror angular position M1' before the start of the reverse-shift-activated operation is V1, when the gear-shifting means of the vehicle is set to a reverse position and the mirror surface is turned downward until the Hall voltage reaches V2 ($V2=V1-\Delta M \times \Delta V$) by changing (decreasing) a set value of $\Delta M \times \Delta V$, the mirror surface turns by an angular displacement $\Delta M'$ (e.g., $\Delta M'=8°$ if $\Delta M=6°$) larger than the target angular displacement $\Delta M$ and stops at a mirror angular position M2'. Thus, the mirror turns excessively, making it difficult for the driver to visually check areas around rear wheels and thereby obstructing the driver in backing up the vehicle.

SUMMARY OF THE INVENTION

The present invention is intended to solve the above problems with the conventional techniques and provide a position detection apparatus with an expanded range of good linearity in a magnetic sensor's output characteristic with respect to position of a movable body as well as to provide a vehicle mirror angle detection apparatus using the position detection apparatus.

The present invention provides a position detection apparatus, comprising: two permanent magnets and one magnetic sensor, wherein the two permanent magnets are arranged with their relative position fixed; the magnetic sensor is placed laterally to the arrangement of the two permanent magnets; the two permanent magnets and the magnetic sensor move relative to each other in a direction parallel to an arranging direction of the two permanent magnets; those surfaces of the two permanent magnets which face the magnetic sensor constitute magnetic pole faces of opposite polarity and the magnetic pole faces are placed with an inward tilt; a magnetic sensing direction of the magnetic sensor is set orthogonally to the arranging direction of the two permanent magnets; and the magnetic sensor produces an output corresponding to relative position between the two permanent magnets and the magnetic sensor in the direction of the relative movement.

With the position detection apparatus according to the present invention, since those magnetic pole faces of the two permanent magnets which face the magnetic sensor are placed with an inward tilt, it is possible to expand a range of good linearity in the magnetic sensor's output characteristic with respect to position of a movable body as described later.

In the position detection apparatus according to the present invention, the tilt angle of the magnetic pole faces of the two permanent magnets placed with an inward tilt may be set at larger than 10° and smaller than 80°, for example, with respect to the arranging direction of the two permanent magnets.

In the position detection apparatus according to the present invention, when the two permanent magnets are located at equal distances from the magnetic sensor, the angle formed by a straight line connecting a sensing point of the magnetic sensor and the midpoint of a straight line joining the center points of the magnetic pole faces on those sides of the two permanent magnets which face the magnetic sensor with each of straight lines connecting the sensing point of the magnetic sensor and the center points of the magnetic pole faces on those sides of the two permanent magnets which face the magnetic sensor may be set, for example, at 45±5°.

In the position detection apparatus according to the present invention, distance between the center points of the magnetic pole faces of the two permanent magnets is set such that stroke length of the relative movement between the two permanent magnets and the magnetic sensor may be, for example, 80% or less of distance between the center points of the magnetic pole faces of the two permanent magnets.

In the position detection apparatus according to the present invention, on a plane in which the center points of the magnetic pole faces on those sides of the two permanent magnets which face the magnetic sensor and the sensing point of the magnetic sensor are located, length of the magnetic pole faces of the two permanent magnets may be set to, for example, equal to or larger than ⅓ of the stroke length of the relative movement but not so large that the two permanent magnets will touch each other.

The present invention provides a vehicle mirror angle detection apparatus, comprising: a mirror body which is tiltably supported in a mirror housing and whose mirror angle is adjusted by a motor-driven tilting operation; a slide member which has one end pivotably supported at a position off the center point of the tilting operation on the back of the mirror body and moves linearly in a direction orthogonal to a surface of the mirror body along with the tilting operation of the mirror body; two permanent magnets mounted on the slide member, being arranged along the direction of linear movement; and a magnetic sensor attached to a fixed part in the mirror housing, wherein the two permanent magnets and the magnetic sensor are arranged in the same manner as in the position detection apparatus according to the present invention, and the magnetic sensor produces an output corresponding to the mirror angle of the mirror body.

DETAILED DESCRIPTION OF THE PREFERRED EMBODIMENTS

Embodiment of Position Detection Apparatus

Figure 1:
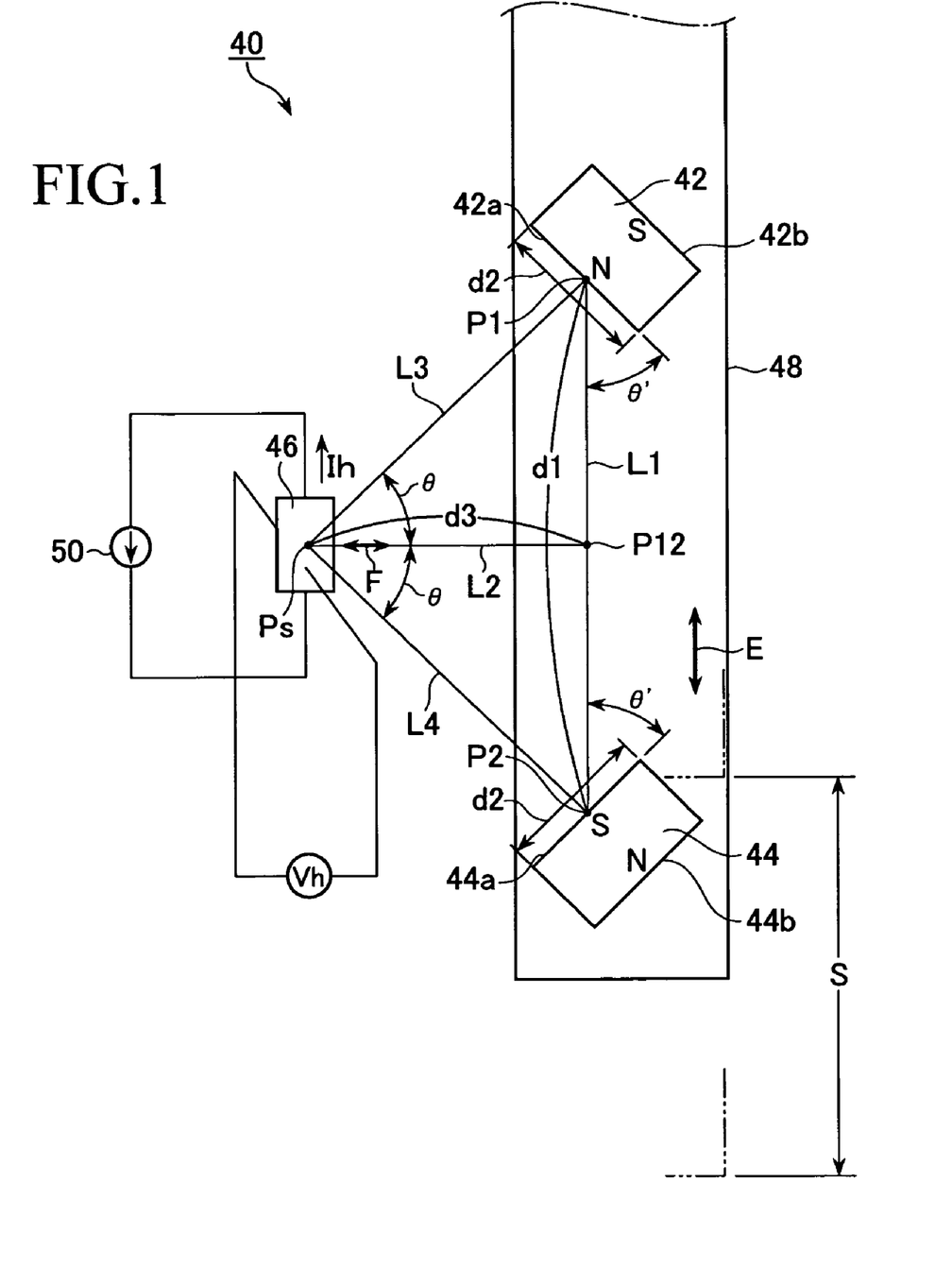
FIG. 1 is a schematic view showing an embodiment of a position detection apparatus according to the present invention.

An embodiment of a position detection apparatus according to the present invention will be described below. A case in which a magnetic sensor is fixed and two permanent magnets are movable will be described here, but it is alternatively possible that two permanent magnets are fixed and a magnetic sensor is movable. FIG. 1 shows an embodiment of the position detection apparatus according to the present invention. The position detection apparatus 40 has two permanent magnets 42 and 44 with the same properties and one magnetic sensor 46. The permanent magnets 42 and 44 are stationarily placed apart from each other on a movable body 48 whose position is to be detected. The magnetic sensor 46 is stationarily placed at a fixed position lateral to the two permanent magnets 42 and 44. The movable body 48 moves in a direction parallel to an arranging direction of the two permanent magnets 42 and 44, i.e., in the direction indicated by arrow E.

The permanent magnets 42 and 44 have the same shape—the shape of a rectangular parallelepiped. Their magnetization direction is parallel to a plane (the plane of the paper in FIG. 1) in which points P1, P2, and P s described later are located and is oriented along the shorter dimension of the rectangular parallelepiped. Those surfaces 42a and 44a of the permanent magnets 42 and 44 which face the magnetic sensor 46 constitute magnetic pole faces of opposite polarity. Specifically, if that magnetic pole face 42a of the permanent magnet 42 which faces the magnetic sensor 46 constitutes the North magnetic pole and the magnetic pole face 42b on the reverse side constitutes the South magnetic pole, that magnetic pole face 44a of the permanent magnet 44 which faces the magnetic sensor 46 constitutes the South magnetic pole and the magnetic pole face 44b on the reverse side constitutes the North magnetic pole. The magnetic pole faces 42a and 44a of the permanent magnets 42 and 44 which face the magnetic sensor 46 are placed with an inward tilt.

According to this embodiment, the magnetic sensor 46 consists of a Hall-effect sensor. The Hall-effect sensor 46 is supplied with a bias current Ih in the direction parallel to the arranging direction (direction indicated by arrow E) of the permanent magnets 42 and 44, from a constant current source 50. Consequently, a magnetic sensing direction of the Hall-effect sensor 46, i.e., a direction in which the Hall-effect sensor 46 responds to magnetism is orthogonal to the bias current Ih, and thus the magnetic sensing direction is set to orthogonal (direction indicated by arrow F) to the arranging direction (direction indicated by arrow E) of the permanent magnets 42 and 44. With this arrangement, when the movable body 48 moves together with the permanent magnets 42 and 44 in a direction indicated by arrow E, out of components of the magnetic flux of the permanent magnets 42 and 44 which links the Hall-effect sensor 46, a component oriented in the magnetic sensing direction F of the Hall-effect sensor 46 changes, causing the Hall-effect sensor 46 to output a Hall voltage Vh corresponding to the position of the movable body 48 in a direction orthogonal to both of the direction of the bias current Ih and magnetic sensing direction F. This makes it possible to detect the position of the movable body 48 by detecting the Hall voltage Vh.

Now description will be given of how positional relationship between the permanent magnets 42 and 44 and Hall-effect sensor 46 as well as the size of the permanent magnets 42 and 44 affect improvement in linearity of the output of the Hall-effect sensor 46 with respect to the position of the movable body 48 (i.e., expansion of the range in which good linearity can be obtained). Preferably, with the distances from the Hall-effect sensor 46 to the permanent magnets 42 and 44 are in a mutually equal positional relationship (in a neutral position shown in FIG. 1), the angles $\theta$ formed by a straight line L2 connecting the sensing point (center point of magnetic sensing) Ps of the Hall-effect sensor 46 and the midpoint P12 of a straight line L1 joining the center points P1 and P2 of the magnetic pole faces 42a and 44a of the permanent magnets 42 and 44 with straight lines L3 and L4 connecting the sensing point Ps of the Hall-effect sensor 46 and the center points P1 and P2 of the magnetic pole faces 42a and 44a of the permanent magnets 42 and 44 are set at an equal value of 45±5° (an ideal angle is considered to be 45°). Preferably, the tilt angles $\theta$ of the magnetic pole faces 42a and 44a placed with an inward tilt are set at an equal value of 10°<$\theta'$<80° with respect to the arranging direction (direction indicated by arrow E) of the permanent magnets 42 and 44 (an ideal angle is considered to be 45°).

The distance d1 between the center points P1 and P2 of the magnetic pole faces 42a and 44a of the permanent magnets 42 and 44 as well as the longer dimension d2 (length of the magnetic pole faces 42a and 44a of the permanent magnets 42 and 44 in a plane in which the center points P1 and P2 of the magnetic pole faces 42a and 44a of the permanent magnets 42 and 44 and the sensing point Ps of the Hall-effect sensor 46 are located) of the permanent magnets 42 and 44 are respectively set according to stroke length S of the movable body 48. Preferably, the distance d1 between the center points P1 and P2 of the magnetic pole faces 42a and 44a of the permanent magnets 42 and 44 is set such that the stroke length S will be not larger than 80% of the distance d1 ($0<S\leq 0.8 \times d1$), and more preferably, not larger than 75% of the distance d1 ($0<S\leq 0.75 \times d1$). Also, preferably length d2 of the permanent magnets 42 and 44 are equal to or larger than ⅓ of the stroke length S but not so large that the two permanent magnets will touch each other.

To summarize the above discussion, in the configuration in FIG. 1, important parameters which affect the linearity of the output of the Hall-effect sensor 46 with respect to position of the movable body 48 include the angles θ and θ' and distances (lengths) d1 and d2. Regarding the settings of the angles θ and θ', preferably, $\theta=45°\pm5°$ and $10°<\theta'<80°$. On the other hand, the distances (lengths) d1 and d2 are set according to the stroke length S. Incidentally, distance d3 between the midpoint P12 of a straight line L1 joining the center points P1 and P2 of the magnetic pole faces 42a and 44a of the permanent magnets 42 and 44 and the sensing point Ps of the Hall-effect sensor 46 are determined automatically once the angle θ and distance d1 are determined. When priority is given to the distance d3, after setting the distance d3, the distance d1 may be set so that the angle θ falls within 45°±5° and stroke length S will satisfy the above relationship.

Figure 5:
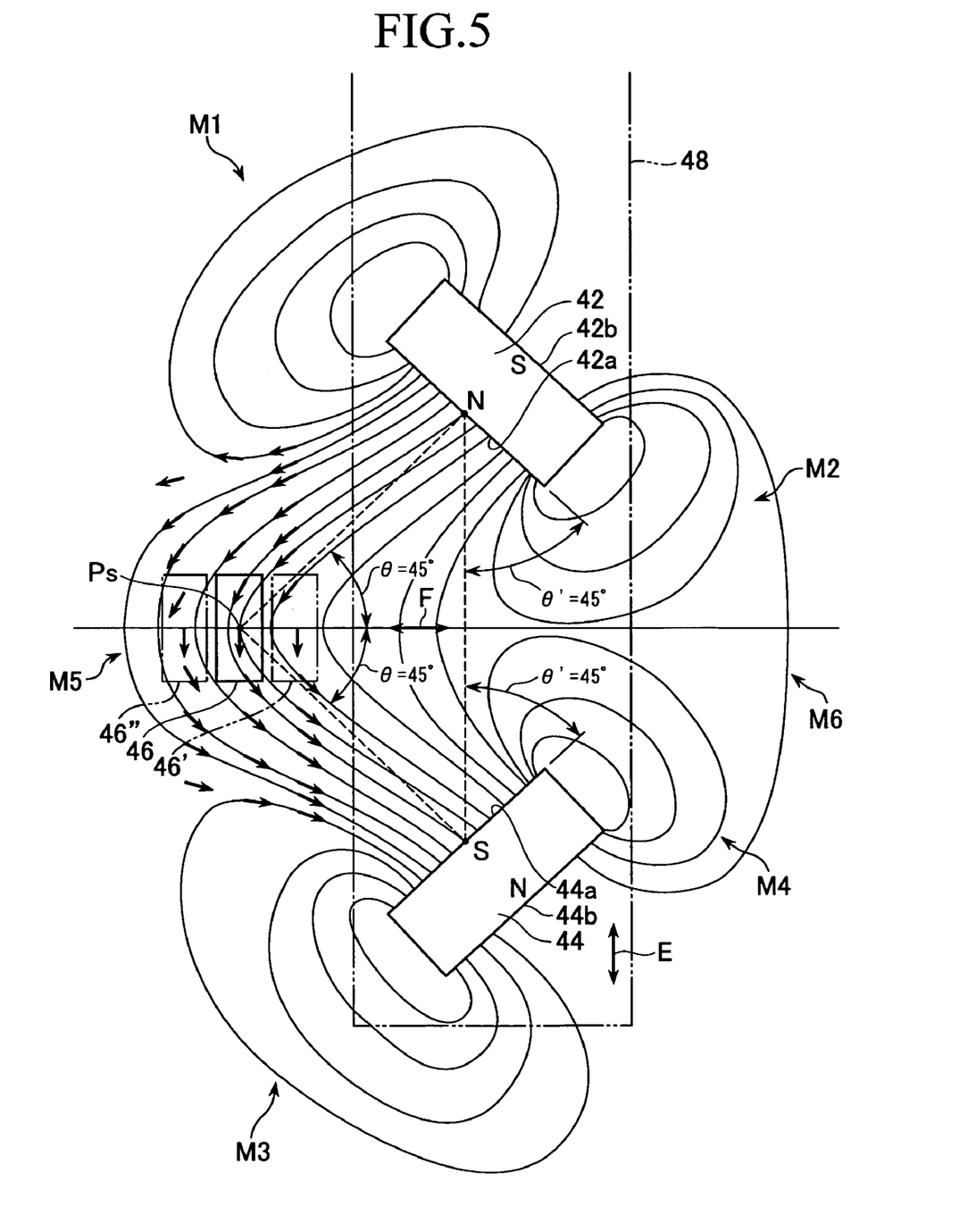
FIG. 5 is a magnetic line distribution chart according to the arrangement in FIG. 1.

A distribution of magnetic lines in the configuration in FIG. 1 is shown in FIG. 5. In FIG. 5, the angle θ with respect to the position of the Hall-effect sensor 46 indicated by a solid line is set at 45°. Also, the angle θ' is set at 45°. The distribution of magnetic lines is composed of magnetic lines M1 and M2 generated between their own magnetic pole faces 42a and 42b at the longitudinal ends of the permanent magnet 42, magnetic lines M3 and M4 generated between their own magnetic pole faces 44a and 44b at the longitudinal ends of the permanent magnet 44, magnetic lines M5 generated between the magnetic pole faces 42a and 44a of the permanent magnets 42 and 44, and magnetic lines M6 generated between the magnetic pole faces 42b and 44b of the permanent magnets 42 and 44. The Hall-effect sensor 46 is linked mainly by the magnetic lines M5 generated between the magnetic pole faces 42a and 44a of the permanent magnets 42 and 44. If the stroke length S is large, the Hall-effect sensor 46 is also linked by part of the magnetic lines M1 and M3 at the ends of the stroke.

Figure 6:
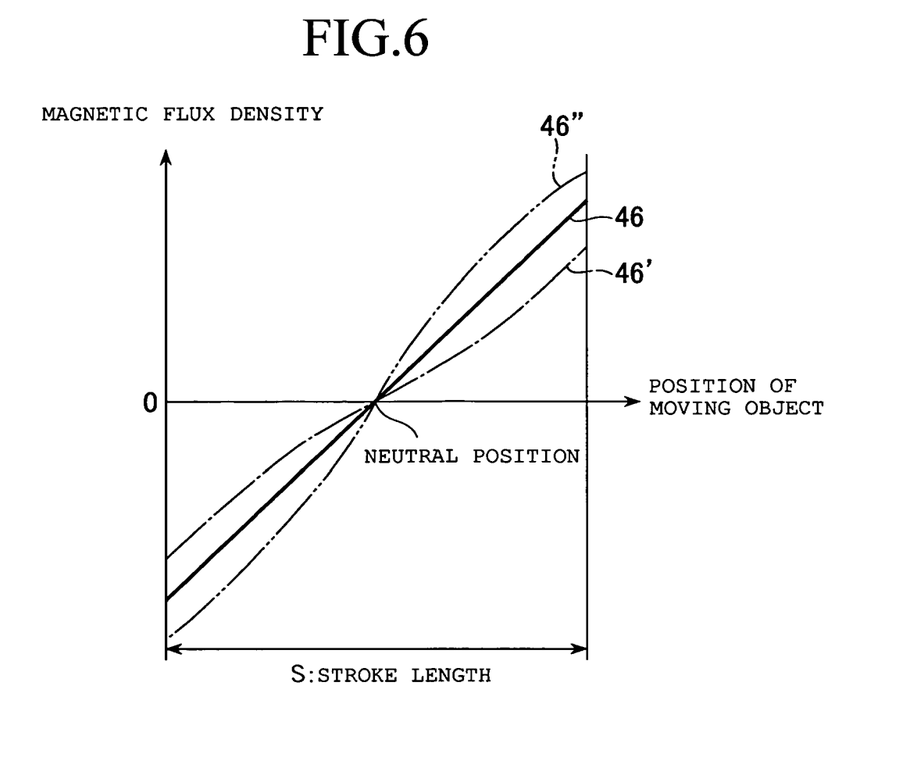
FIG. 6 is a diagram showing a characteristic of magnetic flux density in a magnetic sensing direction F of a Hall-effect sensor 46 with respect to position of a movable body 48 in a moving direction E, where the characteristic depends on distance (in a direction orthogonal to the moving direction E) between the Hall-effect sensor 46 and permanent magnets 42 and 44.
Figure 7:
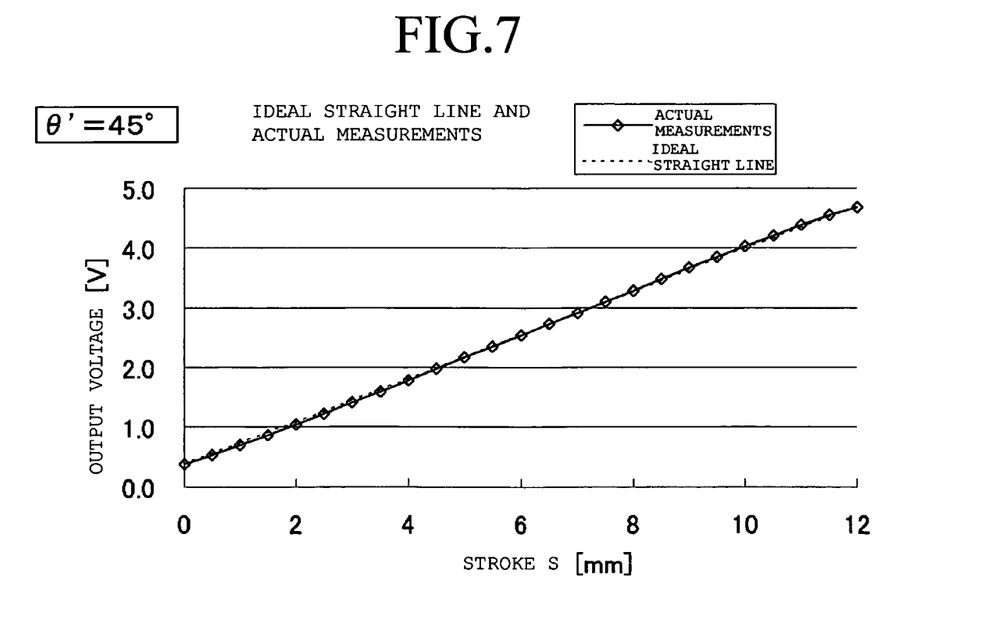
FIG. 7 is a diagram showing a relationship of output voltage of the Hall-effect sensor 46 to the position of the movable body 48 in the moving direction E when the angle $\theta'$ in FIG. 5 is set at 45°.
Figure 8:
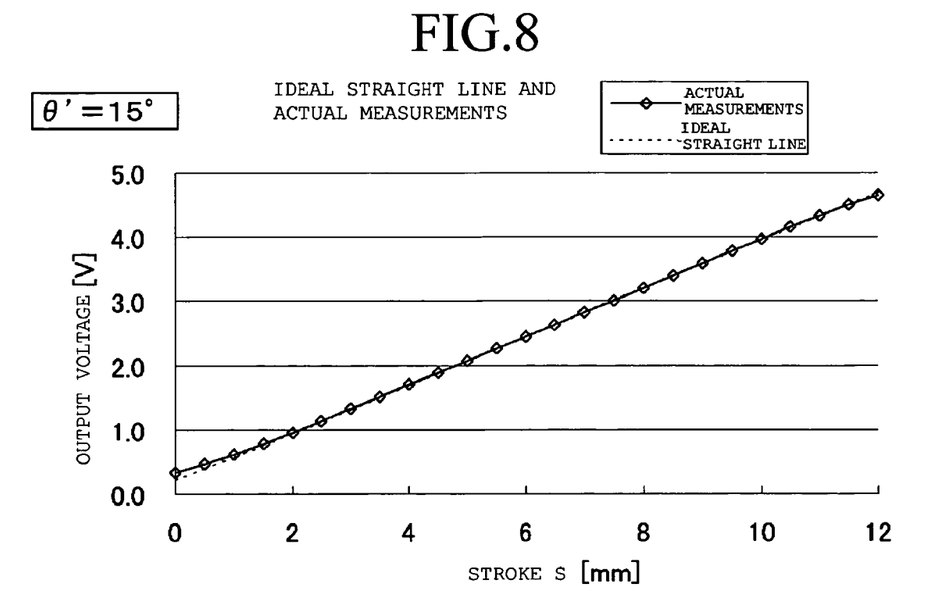
FIG. 8 is a diagram showing a relationship of output voltage of the Hall-effect sensor 46 to the position of the movable body 48 in the moving direction E when the angle $\theta'$ in FIG. 5 is set at 15°.

A solid line in FIG. 6 shows a relationship between the position of the movable body 48 and magnetic flux density of that flux component of the magnetic flux of the permanent magnets 42 and 44 linking the Hall-effect sensor 46 which is oriented in the magnetic sensing direction F of the Hall-effect sensor 46. According to the line, it can be seen that good linearity is obtained over the entire stroke length S. The Hall voltage Vh of the Hall-effect sensor 46 is proportional to the magnetic flux density, resulting in good linearity of the Hall voltage Vh with respect to the position of the movable body 48 in the moving direction E (a wide range of good linearity can be obtained).

In FIG. 5, when the Hall-effect sensor 46 is brought closer to the movable body 48 as indicated by numeral 46' (i.e., when the angle θ is increased over 45°), the relationship between the position of the movable body 48 in the moving direction E and magnetic flux density of that flux component of the magnetic flux linking the Hall-effect sensor 46 which is oriented in the magnetic sensing direction F of the Hall-effect sensor 46 gradually declines loosing linearity as indicated by a single-dot chain line in FIG. 6 (the rage of good linearity becomes narrower). Also, in FIG. 5, when the Hall-effect sensor 46 is moved away from the movable body 48 as indicated by numeral 46" (i.e., when the angle θ is decreased below 45°), the relationship between the position of the movable body 48 in the moving direction E and magnetic flux density of that flux component of the magnetic flux linking the Hall-effect sensor 46 which is oriented in the magnetic sensing direction F of the Hall-effect sensor 46 gradually rises loosing linearity as indicated by a two-dot chain line in FIG. 6 (the rage of good linearity becomes narrower).

FIGS. 7 to 10 show relationship (actual measurements) of output voltage of the Hall-effect sensor 46 to the position of the movable body 48 in the moving direction E when the angle θ' is varied, with the Hall-effect sensor 46 being located at the position indicated by a solid line (θ=45°) in FIG. 5. The value of the angle θ' is 45° in FIG. 7, 15° in FIG. 8, 10° in FIG. 9, and 0° in FIG. 10. Incidentally, in FIGS. 7 to 10, the stroke length S of the movable body 48 is 12 mm, and the 6-mm position at the center corresponds to the neutral position in FIG. 5. In FIGS. 7 to 10, the solid line represents actual characteristic of the output voltage of the Hall-effect sensor 46 with respect to the position of the movable body 48 in the moving direction E and the dotted line is an ideal line. A bias voltage is applied to the Hall voltage so that output voltage of positive polarity can be obtained over the entire stroke length S.

Figure 9:
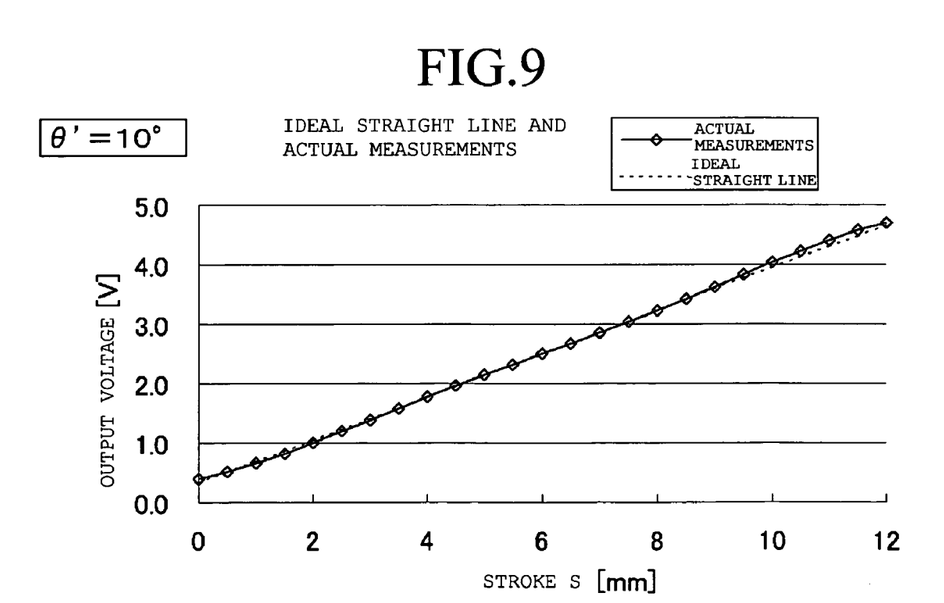
FIG. 9 is a diagram showing a relationship of output voltage of the Hall-effect sensor 46 to the position of the movable body 48 in the moving direction E when the angle $\theta'$ in FIG. 5 is set at 10°.
Figure 10:
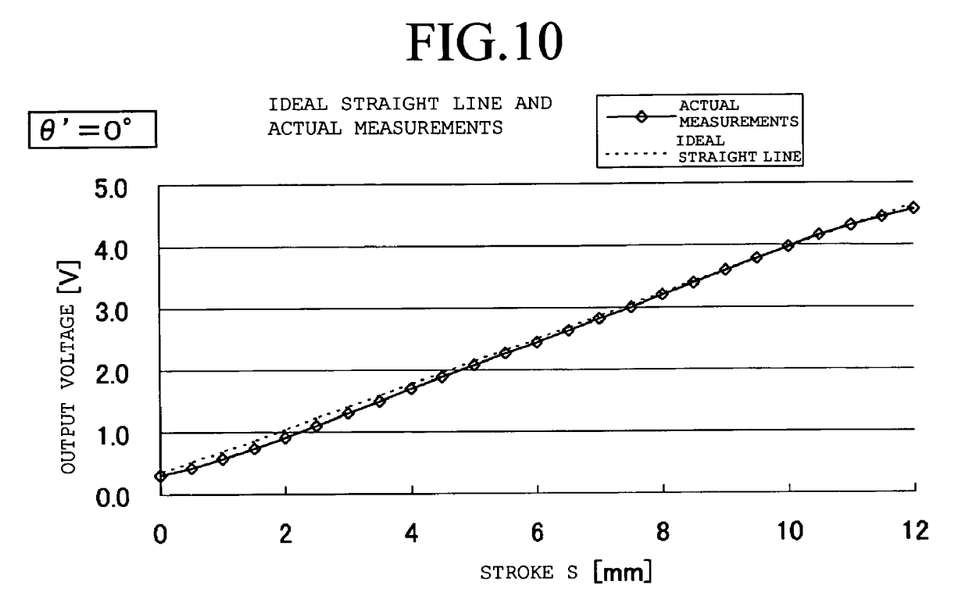
FIG. 10 is a diagram showing a relationship of output voltage of the Hall-effect sensor 46 to the position of the movable body 48 in the moving direction E when the angle $\theta'$ in FIG. 5 is set at 0°.

According to FIGS. 7 to 10, it can be seen that the best linearity (the widest range of good linearity) is obtained when θ'=45° (FIG. 7), and the linearity falls (the rage of good linearity becomes narrower) gradually with decreases in the value of the angle θ' and the linearity degrades prominently when $\theta'\leq 10°$ (FIGS. 9 and 10). Thus, it is desirable that the angle θ' is larger than 10°. Also, the linearity falls (the rage of good linearity becomes narrower) gradually with increases when the angle θ' is over 45° and the linearity degrades prominently when $\theta'\geq 80°$. Thus, it can be said that it is desireble that the angle θ' is smaller than 80°.

Embodiment of Vehicle Mirror Angle Detection Apparatus

Figure 11:
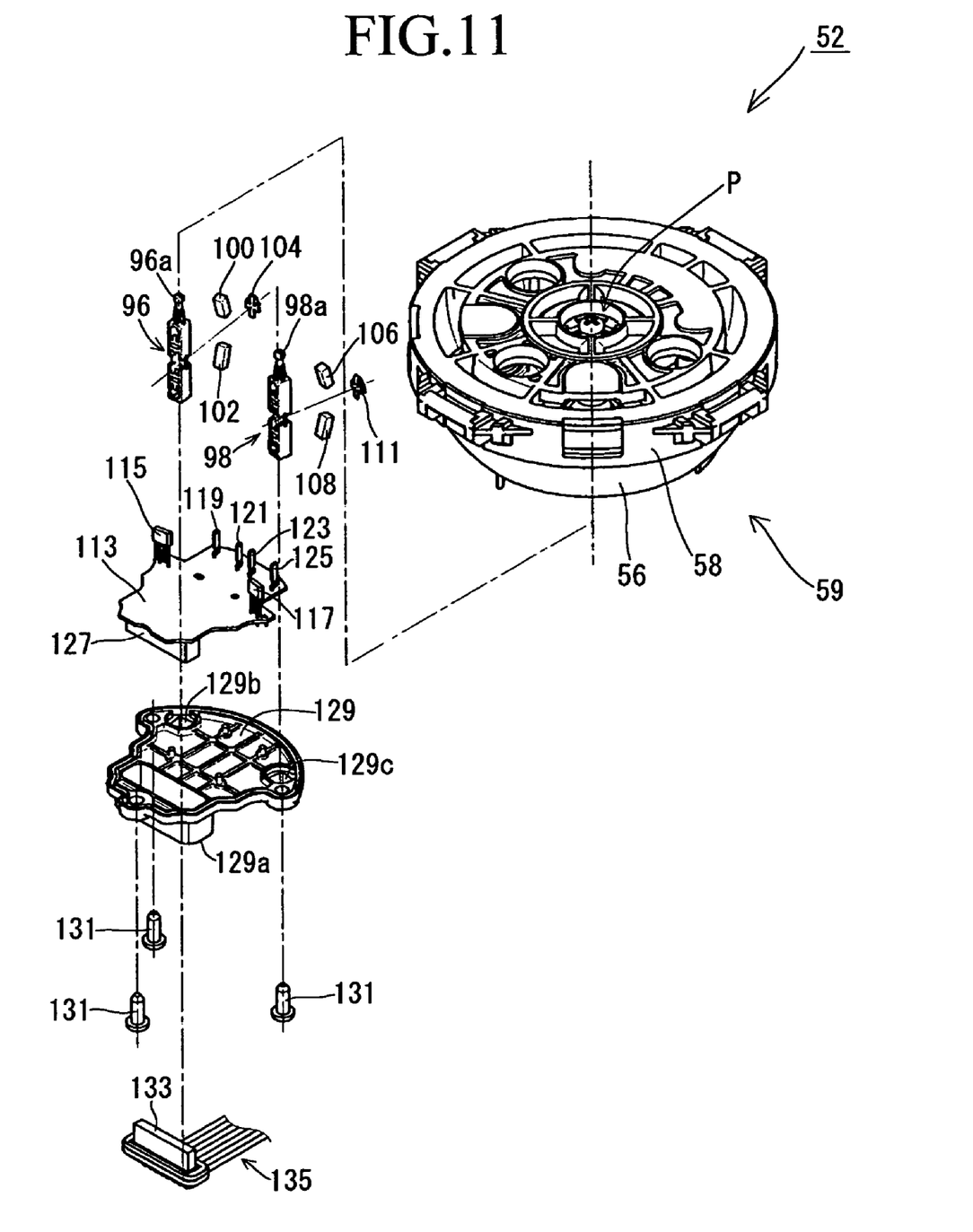
FIG. 11 is a partially exploded perspective view showing an embodiment of a vehicle mirror drive unit equipped with the vehicle mirror angle detection apparatus according to the present invention.

An embodiment of a vehicle mirror angle detection apparatus according to the present invention which uses the position detection apparatus according to the present invention will be described below. FIG. 11 shows a vehicle mirror drive unit 52 (mirror angle adjustment actuator unit) equipped with the mirror angle detection apparatus according to the present invention. The mirror drive unit 52 is housed in a front opening (denoted by reference numeral 57 in FIG. 13) of a mirror housing (denoted by reference numeral 54 in FIG. 13) for a vehicle mirror. The mirror drive unit 52 is equipped with a housing front 56 (fixed part) stationarily placed in the mirror housing 54 via a frame (denoted by reference numeral 55 in FIG. 13) and a plate pivot 58 (tilting part) coupled to the housing front 56 by a pivot P in such a way as to be tiltable (swingable) in all directions (up-and-down direction and left-to-right direction).

Figure 12:
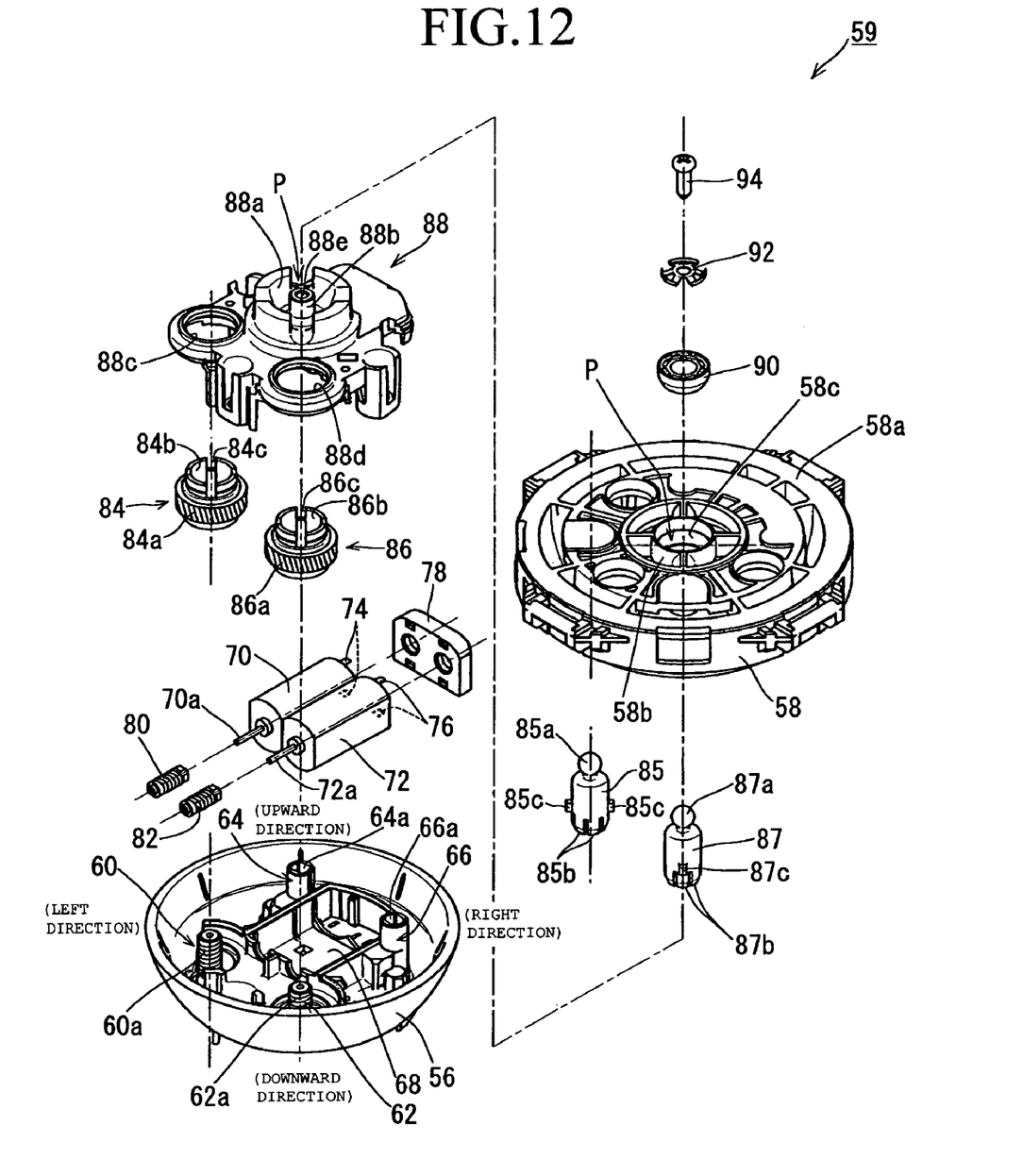
FIG. 12 is an exploded perspective view of a subassembly 59 in the vehicle mirror drive unit 52 in FIG. 11.

FIG. 12 shows an exploded view of an assembly 59 (subassembly) of the housing front 56 and plate pivot 58 in FIG. 11. In FIG. 12, in an inner bottom of the housing front 56, four projections 60, 62, 64, and 66 are formed around the central axis of the housing front 56 at equal intervals in almost the circumferential direction. Thread grooves 60*a* and 62*a* are formed in outer surfaces of the projections 60 and 62. The projections 64 and 66 have a cylindrical form. A recess 68 is formed in that part of the inner bottom of the housing front 56, which is surrounded by the projections 60, 62, 64, and 66. The recess 68 houses a horizontal mirror angle adjustment motor 70 and vertical mirror angle adjustment motor 72. A power adaptor 78 is mounted on the rear end where electrode terminals 74 and 76 of the motors 70 and 72 are installed. Worms 80 and 82 are mounted on rotating shafts 70*a* and 72*a* of the motors 70 and 72.

In the inner bottom of the housing front 56, worm wheels 84 and 86 are mounted coaxially with the projections 60 and 62. Gears 84*a* and 86*a* on the outer surface of the worm wheels 84 and 86 engage with the worms 80 and 82. After the motors 70 and 72 fitted with the worms 80 and 82 and the power feed adaptor 78 as well as the worm wheels 84 and 86 are mounted in the inner bottom of the housing front 56, a rear housing 88 is put on the housing front 56. The rear housing 88 is screwed to the inner bottom of the housing front 56. A semispherical recess 88*a* is formed in the front face of the rear housing 88 to form a pivot P. A boss 88*b* sticks out from the center of the semispherical recess 88*a*. A screw hole 88*e* is formed on the top of the boss 88*b*. Openings 88*c* and 88*d* are formed in the front face of the rear housing 88. The openings 88*c* and 88*d* are communicated with hollow parts 84*b* and 86*b* of the worm wheels 84 and 86.

Universal joints (spherical recesses), not shown, are formed on the back (lower face) of the plate pivot 58. Spherical parts 85*a* and 87*a* formed at the upper end of adjustment nuts 85 and 87 are fitted in the universal joints. Consequently, the adjustment nuts 85 and 87 are pivotally coupled with the back (lower face) of the plate pivot 58. Hollow parts (not shown) opening downward are formed in the adjustment nuts 85 and 87. The adjustment nuts 85 and 87 are inserted into the hollow parts 84*b* and 86*b* of the worm wheels 84 and 86, respectively, through the openings 88*c* and 88*d* of the rear housing 88, respectively. In so doing, the projections 60 and 62 of the housing front 56 are inserted into the hollow parts of the adjustment nuts 85 and 87, respectively. Juts 85*c* and 87*c* are formed on flanks of the adjustment nuts 85 and 87, respectively. The juts 85*c* and 87*c* are slidably housed in axial slits 84*c* and 86*c* formed in flanks of the worm wheels 84 and 86. This makes the adjustment nuts 85 and 87 movable along the axis and incapable of relative rotation around the axis with respect to the worm wheels 84 and 86.

Claws (hooks) 85*b* and 87*b* are formed on lower ends of the adjustment nuts 85 and 87. The claws 85*b* and 87*b* are engaged, respectively, with the thread grooves 60*a* and 62*a* in the outer surfaces of the projections 60 and 62 in the housing front 56. With this configuration, when the motor 70 is driven, the worm wheel 84 rotates together with the adjustment nut 85 via the worm 80. Consequently, due to the engagement between the thread groove 60*a* of the projection 60 and the claw 85*b* of the adjustment nut 85, the adjustment nut 85 moves along the axis, causing the plate pivot 58 to tilt to the right and left, thereby making a horizontal mirror angle adjustment. Also, when the motor 72 is driven, the worm wheel 86 rotates together with the adjustment nut 87 via the worm 82. Consequently, due to the engagement between the thread groove 62*a* of the projection 62 and the claw 87*b* of the adjustment nut 87, the adjustment nut 87 moves along the axis, causing the plate pivot 58 to tilt up and down, thereby making a vertical mirror angle adjustment.

A mirror body 137 (FIG. 13) is mounted on a front face 58*a* of the plate pivot 58. A semispherical protrusion 58*b* is formed in the back center of the plate pivot 58 to form a pivot P. The semispherical protrusion 58*b* is housed in the semispherical recess 88*a* of the rear housing 88 in such a way as to be tiltable in all directions (up-and-down direction and left-to-right direction). Consequently, the plate pivot 58 is supported on the housing front 56 in such a way as to be tiltable in all directions via the pivot P. On the front face (upper face) of the semispherical protrusion 58*b*, a semispherical recess 58*c* is formed concentrically with the semispherical protrusion 58*b*. A semispherical cap support 90 is housed in the semispherical recess 58*c* in such a way as to be tiltable in all directions. A spring 92 (leaf spring) is placed on the front face (upper face) of the cap support 90. A tapping screw 94 is screwed over the spring 92 into the screw hole 88*e* on the top of the boss 88*b* in the rear housing 88, passing through the center of the spring 92, cap support 90, and plate pivot 58. Consequently, being pressed by the spring 92, the plate pivot 58 is coupled with the housing front 56 without looseness in such a way as to be tiltable in all directions via the pivot P.

The subassembly 59 in FIG. 11 is obtained by assembling the components in FIG. 12 described above. In FIG. 11, slide blocks 96 and 98 (slide members) are constructed in the shape of square bars. They are inserted into hollow parts (slide holes) 64*a* and 66*a* of the projections 64 and 66 (FIG. 12) in the housing front 56 through lower openings of the slide holes 64*a* and 66*a* and housed in the slide holes 64*a* and 66*a* in such a way as to be slidable in the axial direction. The slide holes 64*a* and 66*a* have a square cross section in conformance with the shape of the square-bar-shaped slide blocks 96 and 98 to restrain rotation of the slide blocks 96 and 98 around the axis. Spherical parts 96*a* and 98*a* are formed on upper ends of the slide blocks 96 and 98. The slide blocks 96 and 98 are pivotally coupled with the plate pivot 58 by fitting the spherical parts 96*a* and 98*a* in a universal joint (denoted by reference numeral 143 in FIG. 13) on the back (lower face) of the plate pivot 58. Spaces (denoted by reference numerals 145, 149, and 147 in FIG. 13) formed in the slide block 96 house permanent magnets 100 and 102 with the same properties and a plate spring (leaf spring) 104, respectively. Spaces (denoted by reference numerals 145, 149, and 147 in FIG. 13) formed in the slide block 98 house permanent magnets 106 and 108 with the same properties and a plate spring (leaf spring) 111, respectively. The permanent magnets 100, 102, 106, and 108 are, for example, neodymium magnets.

In FIG. 11, a vertical mirror angle detecting Hall-effect sensor 115 and a horizontal mirror angle detecting Hall-effect sensor 117 as well as power supply terminals 119, 121, 123, and 125 are fixed in a standing position to the upper face of a circuit board 113, where the power supply terminals 119, 121, 123, and 125 are inserted in the power feed adaptor 78 (FIG. 12) to supply power to the motors 70 and 72. A socket 127 is stationarily placed on the lower face of a circuit board 113. Terminals of lead wires from the Hall-effect sensors 115 and 117 and power supply terminals 119, 121, 123, and 125 are arranged in the socket 127. The circuit board 113 is stationarily mounted on the upper face of a cover 129. The cover 129 is mounted on the back of the housing front 56 with three tapping screws 131. At this time, the Hall-effect sensor 115 is facing the slide block 96 which is inserted in the slide hole 64*a* of the projection 64 (FIG. 12), and placed laterally to an arrangement of the permanent magnets 100 and 102. Also, the Hall-effect sensor 117 is facing the slide block 98 which is inserted in the slide hole 66a of the projection 66 (FIG. 12), and placed laterally to an arrangement of the permanent magnets 106 and 108. On a connector 133, terminals of cable groups 135 for use to supply power to the motors 70 and 72, to drive the Hall-effect sensors 115 and 117, and to take output signals from the Hall-effect sensors 115 and 117 and the like are arranged. The connector 133 is plugged into the socket 127 on the circuit board 113 via an opening 129a in the cover 129.

Figure 13:
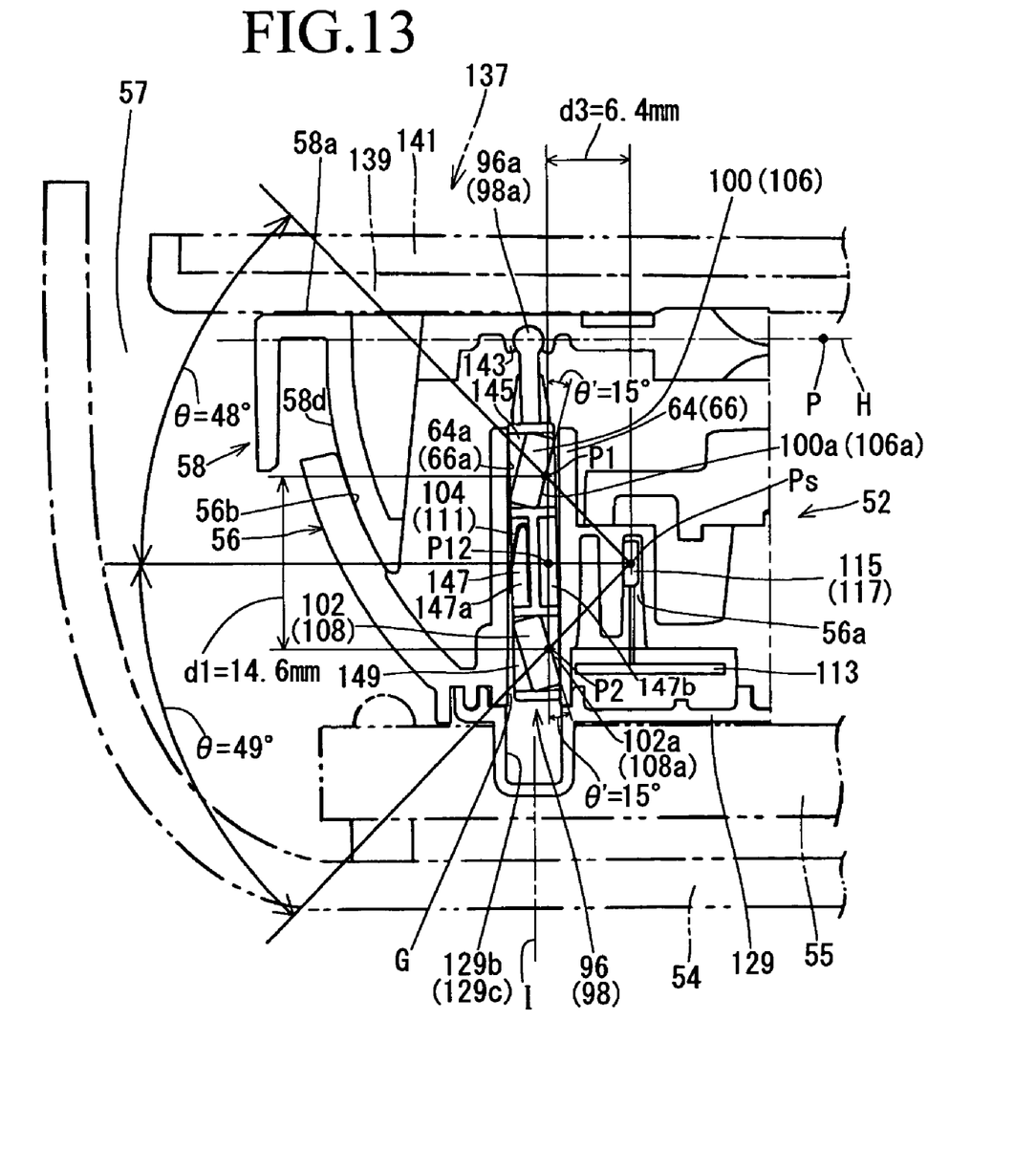
FIG. 13 is a sectional view showing part of an internal structure of a vehicle mirror equipped with the vehicle mirror drive unit 52 in FIG. 11 and showing an arrangement of a slide block 96 (98) and Hall-effect sensor 115 (117)

FIG. 13 shows the arrangement of the slide block 96(98) and Hall-effect sensor 115 (117) in the mirror drive unit 52 of the above configuration. In FIG. 13, the mirror drive unit 52 in FIG. 11 is housed in the front opening 57 of the mirror housing 54. In the mirror drive unit 52, the housing front 56 (fixed part) with the cover 129 mounted on the back is stationarily placed on the mirror housing 54 via the frame 55. The plate pivot 58 is coupled with the front face of the housing front 56 in such a way as to be tiltable in all directions via the pivot P. An inner surface 56b of the housing front 56 and outer surface 58d of the plate pivot 58 are formed on a spherical surface of the same radius around the pivot P and the two surfaces 56b and 58d abut each other slidably. Consequently, when the plate pivot 58 tilts, the outer surface 58d of the plate pivot 58 slides over the inner surface 56b of the housing front 56. The sliding allows the plate pivot 58 to tilt in a stable manner.

The mirror body 137 is stationarily mounted on the front face 58a of the plate pivot 58. The mirror body 137 consists of a mirror plate 141 fitted in the front face of a mirror holder 139. The mirror angle is adjusted by tilting the plate pivot 58 around the pivot P with respect to the housing front 56. The single-dot chain line H represents a reference plane of the mirror drive unit 52. When the front face 58a of the plate pivot 58 is parallel to the reference plane H (and thus, the mirror body 137 is parallel to the reference plane H) as shown in FIG. 13, the mirror angle is at a reference position of 0° (neutral state) both in the vertical and horizontal directions. On the rear face of the plate pivot 58, a universal joint (spherical recess) 143 is installed away from the pivot P.

The projection 64 (66) is formed in a standing position in the inner bottom of the housing front 56. The slide hole 64a (66a) is formed in the projection 64 (66). The axis I of the slide hole 64a (66a) is formed perpendicular to the reference plane H. The slide block 96 (98) is pivotally coupled with the plate pivot 58 by fitting the spherical part 96a (98a) at its upper end in the universal joint 143 of the plate pivot 58. The slide block 96 (98) is housed in the slide hole 64a (66a) in such a way as to be slidable along the axis and incapable of rotation around the axis.

Interior of the slide block 96 (98) is partitioned vertically into three layers of space 145, 147, and 149. The top space 145 houses the permanent magnet 100 (106) in a stationary manner. The bottom space 149 houses the permanent magnet 102 (108) in a stationary manner. The middle space 147 is partitioned horizontally into two spaces 147a and 147b, one 147a of which houses the plate spring 104 (111) (leaf spring). The plate spring 104 (111) abuts and presses wall surfaces of the slide hole 64a (66a) to prevent the slide block 96 (98) from rattling in the slide hole 64a (66a).

The cover 129 is mounted on the back of the housing front 56. A slide hole 129b (129c) is formed in the cover 129 in communication with the slide hole 64a (66a) to extend the length of the slide hole 64a (66a) in the housing front 56. The bottom of the slide hole 129b (129c) is closed. The slide block 96 (98) slides along its axis (in the direction perpendicular to the reference plane H) in the slide holes 64a and 129b (66a and 129c) as the plate pivot 58 tilts. A slight clearance G is formed between the slide block 96 (98) and slide holes 64a and 129b (66a and 129c) so as to allow the slide block 96 (98) to move slightly along the reference plane H when the plate pivot 58 tilts.

The circuit board 113 to which the Hall-effect sensor 115 (117) is fixed in a standing position is stationarily placed on the cover 129. As the cover 129 is mounted on the back of the housing front 56, the Hall-effect sensor 115 (117) is stationarily placed in a space 56a formed behind the housing front 56. Consequently, the Hall-effect sensor 115 (117) is placed laterally to the arrangement of the permanent magnets 100 and 102 (106 and 108).

The arrangement of the permanent magnets 100 and 102 (106 and 108) and Hall-effect sensor 115 (117) in FIG. 13 corresponds to the arrangement of the permanent magnets 42 and 44 and Hall-effect sensor 46 in FIG. 1. Specifically, with the mirror drive unit 52 in FIG. 13, slide length (stroke length S) of the slide block 96 (98) (slide member) is 11 mm while the distance d1 between the center points P1 and P2 of those magnetic pole faces 100a and 102a (106a and 108a) of the permanent magnets 100 and 102 (106 and 108) which face the Hall-effect sensor 115 (117) is set at 14.6 mm. The distance d3 between the midpoint P12 of a straight line joining the center points P1 and P2 of the magnetic pole faces 100a and 102a (106a and 108a) of the permanent magnets 100 and 102 (106 and 108) and the sensing point Ps of the Hall-effect sensor 115 (117) is set at 6.4 mm. The angle θ is 48° at the upper side, and 49° at the lower side. Also, the tilt angles θ' of the permanent magnets 100 and 102 (106 and 108) are respectively set at 15°. The permanent magnets 100 and 102 (106 and 108) are neodymium magnets. They measure 6 mm (d2, i.e., along the longitudinal length of the magnetic pole faces)× 2.7 mm (along the width of the magnetic pole faces (in the direction perpendicular to the plane of the paper in FIG. 13))×2.35 mm (thickness, i.e., length in the magnetization direction).

Figure 14:
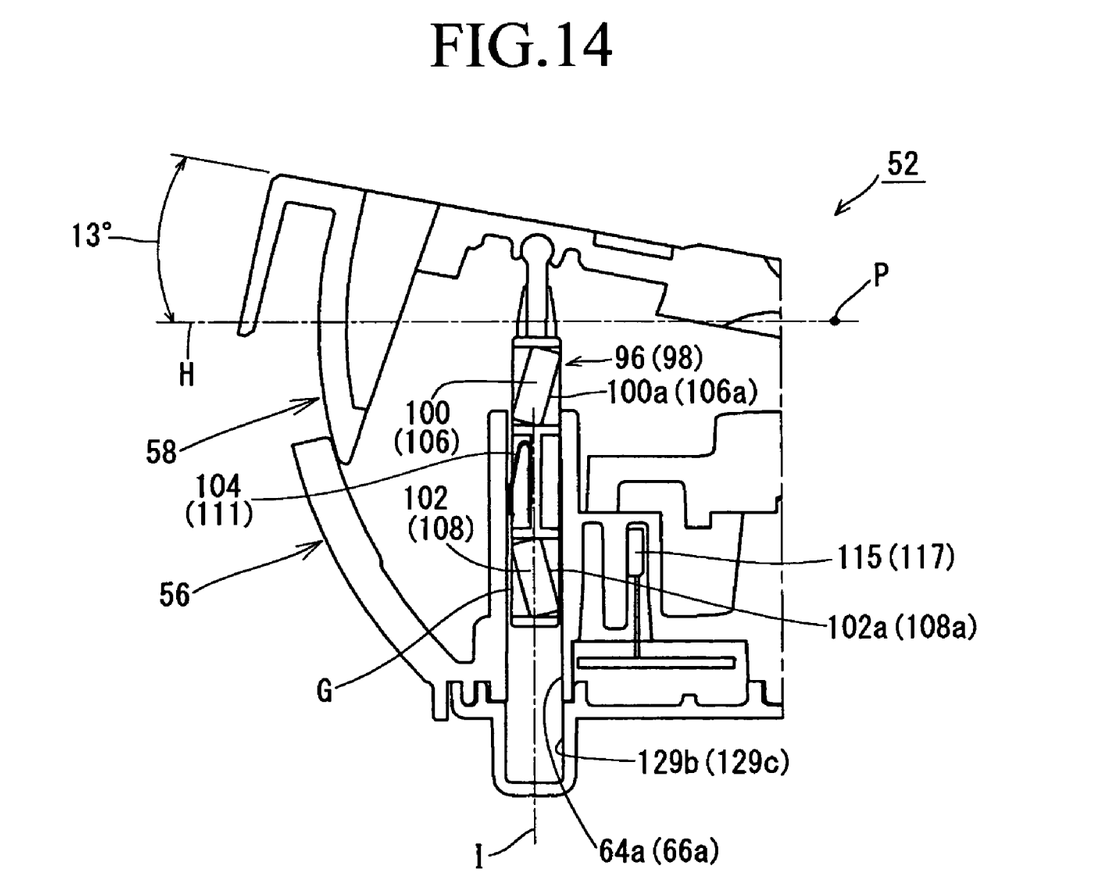
FIG. 14 is a sectional view showing a mirror surface tilted to a maximum angle in one direction from the position shown in FIG. 13.
Figure 15:
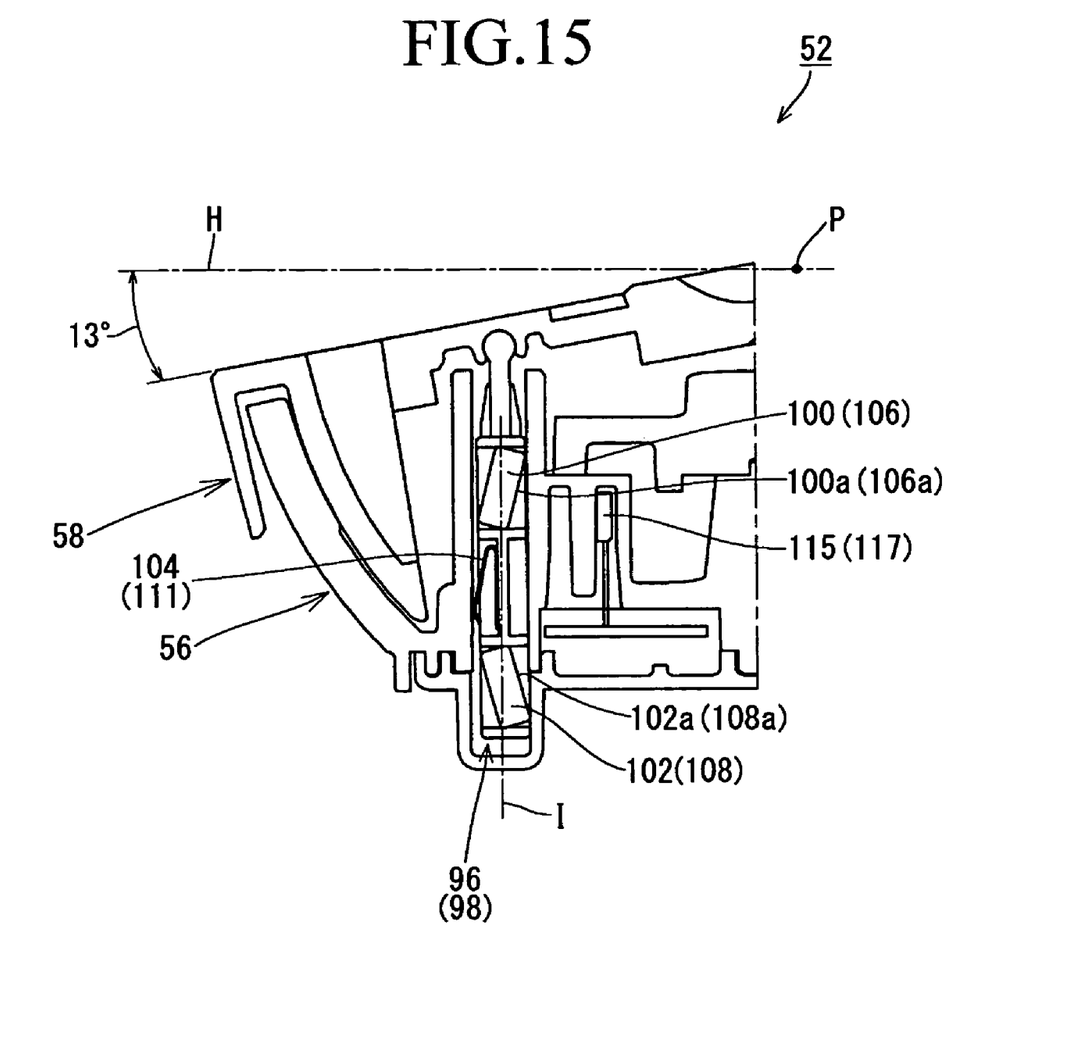
FIG. 15 is a sectional view showing the mirror surface tilted to a maximum angle in another direction from the position shown in FIG. 13.

FIG. 14 shows the mirror surface tilted to a maximum angle in one direction from the position shown in FIG. 13. At this time, the tilt angle from the neutral position is 13°. FIG. 15 shows the mirror surface tilted to a maximum angle in another direction from the position shown in FIG. 13. At this time, the tilt angle from the neutral position is 13°. The stroke length S of the slide block 96 (98) when the mirror surface is tilted by 26° from the maximum angle in one direction to the maximum angle in the other direction is 11 mm. At this time, the characteristic of the output voltage of the Hall-effect sensor 115 (117) with respect to the position of the slide block 96 (98) is sufficiently linear over the entire stroke length S.

Although the slide block 96 (98) tilts with respect to the axis I (perpendicular to the reference plane H) of the slide holes 64a and 129b (66a and 129c) during sliding due to the clearance G formed between the slide block 96 (98) and slide holes 64a and 129b (66a and 129c), the tilt is so small that its effect on the linearity of output characteristic is negligible. The sliding operation of the slide block 96 (98) is obtained by converting the rotation of the mirror surface into linear motion, and therefore the position of the slide block 96 (98) along the direction of the linear motion with respect to the mirror angle is not exactly linear. However, within an angular displacement on the order of 26°, the relationship can be regarded to be almost linear, and the influence on the linearity of output characteristic of the Hall-effect sensor 115 (117) by the conversion of the mirror surface rotation into linear motion is negligible.

Although in the embodiment of the vehicle mirror angle detection apparatus described above, the permanent magnets are installed at locations separate from the mirror angle adjustment members (adjustment nuts 85 and 87 in FIG. 12), two permanent magnets each may be attached to mirror angle adjustment members for vertical and horizontal mirror angle adjustments as in the case of the conventional techniques shown in FIG. 2. This will eliminated the slide blocks 96 and 98.

Also, although two permanent magnets with the same properties are used in the above embodiment, two magnets of different strengths may be used if there are influences from external magnetic fields.

What is claimed is:

1. A position detection apparatus, comprising:
two permanent magnets and one magnetic sensor,
wherein the two permanent magnets are arranged with their relative position fixed;
the magnetic sensor is placed laterally to the arrangement of the two permanent magnets;
the two permanent magnets and the magnetic sensor move relative to each other in a direction parallel to an arranging direction of the two permanent magnets;
those surfaces of the two permanent magnets which face the magnetic sensor constitute magnetic pole faces of opposite polarity and the magnetic pole faces are placed with an inward tilt;
a magnetic sensing direction of the magnetic sensor is set orthogonally to the arranging direction of the two permanent magnets;
the magnetic sensor produces an output corresponding to relative position between the two permanent magnets and the magnetic sensor in the direction of the relative movement; and
wherein distance between the center points of the magnetic pole faces of the two permanent magnets is set such that stroke length of the relative movement between the two permanent magnets and the magnetic sensor will be 80% or less of distance between the center points of the magnetic pole faces of the two permanent magnets.

2. The position detection apparatus according to claim 1, wherein on a plane in which the center points of the magnetic pole faces on those sides of the two permanent magnets which face the magnetic sensor and the sensing point of the magnetic sensor are located, length of the magnetic pole faces of the two permanent magnets is set to equal to or larger than ⅓ of the stoke length of the relative movement but not so large that the two permanent magnets will touch each other.

3. A vehicle mirror angle detection apparatus, comprising: a mirror body which is tiltably supported in a mirror housing and whose mirror angle is adjusted by a motor-driven tilting operation; a slide member which has one end pivotably supported at a position off the center point of the tilting operation on the back of the mirror body and moves linearly in a direction orthogonal to a surface of the mirror body along with the tilting operation of the mirror body; two permanent magnets mounted on the slide member, being arranged along the direction of linear movement; and a magnetic sensor attached to a fixed part in the mirror housing, wherein the two permanent magnets and the magnetic sensor are arranged in the same manner as in the position detection apparatus according to claim 1, and the magnetic sensor produces an output corresponding to the mirror angle of the mirror body.

4. A vehicle mirror angle detection apparatus according to claim 3, wherein the tilt angle of the magnetic pole faces of the two permanent magnets placed with an inward tilt is larger than 10° and smaller than 80° with respect to the arranging direction of the two permanent magnets.

5. A vehicle mirror angle detection apparatus according to claim 3, wherein when the two permanent magnets are located at equal distances from the magnetic sensor, the angle formed by a straight line connecting a sensing point of the magnetic sensor and the midpoint of a straight line joining the center points of the magnetic pole faces on those sides of the two permanent magnets which face the magnetic sensor with each of straight lines connecting the sensing point of the magnetic sensor and the center points of the magnetic pole faces on those sides of the two permanent magnets which face the magnetic sensor is set at 45°±5°.

6. A vehicle mirror angle detection apparatus according to claim 3, wherein distance between the center points of the magnetic pole faces of the two permanent magnets is set such that stroke length of the relative movement between the two permanent magnets and the magnetic sensor will be 80% or less of distance between the center points of the magnetic pole faces of the two permanent magnets.

7. A vehicle mirror angle detection apparatus according to claim 3, wherein on a plane in which the center points of the magnetic pole faces on those sides of the two permanent magnets which face the magnetic sensor and the sensing point of the magnetic sensor are located, length of the magnetic pole faces of the two permanent magnets is set to equal to or larger than ⅓ of the stroke length of the relative movement but not so large that the two permanent magnets will touch each other.

8. A position detection apparatus according to claim 1 wherein the tilt angle of the magnetic pole faces of the two permanent magnets placed with an inward tilt is larger than 10° and smaller than 80° with respect to the arranging direction of the two permanent magnets.

9. A position detection apparatus according to claim 1 wherein when the two permanent magnets are located at equal distances from the magnetic sensor, the angle formed by a straight line connecting a sensing point of the magnetic sensor and the midpoint of a straight line joining the center points of the magnetic pole faces on those sides of the two permanent magnets which face the magnetic sensor with each of straight lines connecting the sensing point of the magnetic sensor and the center points of the magnetic pole faces on those sides of the two permanent magnets which face the magnetic sensor is set at 45°±5°.

* * * * *